United States Patent
Wensing et al.

(10) Patent No.: US 9,732,797 B2
(45) Date of Patent: Aug. 15, 2017

(54) BEARING ARRANGEMENT

(75) Inventors: Jeroen Wensing, Houten (NL); Ian Peverill, Beds (GB); Paul Meaney, Schwarzach-am-Main (DE)

(73) Assignee: AKTIEBOLAGET SKF, Gothenburg (SE)

( * ) Notice: Subject to any disclaimer, the term of this patent is extended or adjusted under 35 U.S.C. 154(b) by 180 days.

(21) Appl. No.: 14/385,479

(22) PCT Filed: Mar. 15, 2012

(86) PCT No.: PCT/EP2012/001176
§ 371 (c)(1),
(2), (4) Date: Feb. 11, 2015

(87) PCT Pub. No.: WO2013/135253
PCT Pub. Date: Sep. 19, 2013

(65) Prior Publication Data
US 2015/0211578 A1   Jul. 30, 2015

(51) Int. Cl.
*F16C 13/00* (2006.01)
*F16C 33/62* (2006.01)
(Continued)

(52) U.S. Cl.
CPC ............ *F16C 33/62* (2013.01); *C22C 38/002* (2013.01); *C22C 38/22* (2013.01); *C22C 38/24* (2013.01); *C22C 38/30* (2013.01); *F16C 33/585* (2013.01); *F16C 19/184* (2013.01); *F16C 33/303* (2013.01); *F16C 33/32* (2013.01); *F16C 33/64* (2013.01); *F16C 2202/04* (2013.01);
(Continued)

(58) Field of Classification Search
CPC ..... F16C 19/182–19/184; F16C 33/585; F16C 33/62; F16C 2202/04; F16C 2204/60; F16C 2204/64; F16C 2204/66; F16C 2240/76; F16C 2326/02
See application file for complete search history.

(56) References Cited

U.S. PATENT DOCUMENTS

| 3,594,051 A * | 7/1971 | Wells .................. B60B 27/0005 301/132 |
| 6,524,008 B1 * | 2/2003 | Yatabe et al. ........... F16C 33/58 384/450 |

(Continued)

FOREIGN PATENT DOCUMENTS

GB          225872      * 12/1925

*Primary Examiner* — James Pilkington
(74) *Attorney, Agent, or Firm* — Bryan Peckjian; SKF USA Inc. Patent Dept.

(57) ABSTRACT

A wheel bearing arrangement for a vehicle, comprising at least one roller bearing, wherein at least one of the roller bearings is a ball bearing, which includes an inner ring and an outer ring, wherein both rings have raceways for balls being located between the rings. To ensure a sufficient lifetime of the roller bearings and to minimize the friction in the bearing, the at least one of the rings of the bearing arrangement is made from a ball bearing steel produced by a powder metallurgical process using a powder metallurgy component including 0.5 to 2.0 weight-% C, a maximum of 0.035 weight-% S, 3.0 to 5.0 weight-% Cr, 1.0 to 4.0 weight-% V, 1.0 to 12.0 weight-% W and 2.0 to 12.0 weight-% Mo, wherein at least one raceway has a radius and the balls have a diameter which fulfills the equation: radius/diameter>0.53.

11 Claims, 2 Drawing Sheets

(51) Int. Cl.

| | |
|---|---|
| *F16C 33/58* | (2006.01) |
| *C22C 38/00* | (2006.01) |
| *C22C 38/22* | (2006.01) |
| *C22C 38/24* | (2006.01) |
| *C22C 38/30* | (2006.01) |
| *F16C 33/32* | (2006.01) |
| *F16C 33/64* | (2006.01) |
| *F16C 19/18* | (2006.01) |
| *F16C 33/30* | (2006.01) |

(52) U.S. Cl.
CPC ...... *F16C 2204/60* (2013.01); *F16C 2204/66* (2013.01); *F16C 2240/76* (2013.01); *F16C 2326/02* (2013.01)

(56) References Cited

U.S. PATENT DOCUMENTS

| | | |
|---|---|---|
| 7,018,107 B2 | 3/2006 | Beswick et al. |
| 2011/0235958 A1 | 9/2011 | Norimatsu |
| 2011/0254355 A1* | 10/2011 | Ciulla ................ B60B 27/0005 301/109 |

* cited by examiner

BEARING ARRANGEMENT

CROSS REFERENCE TO RELATED APPLICATIONS

This is a National Stage application claiming the benefit of International Application Number PCT/EP2012/001176 filed on 15 Mar. 2012, which is incorporated herein by reference in its entirety.

TECHNICAL FIELD

The invention relates to a wheel bearing arrangement for a vehicle, comprising at least one roller bearing, wherein at least one of the roller bearings is a ball bearing, which ball bearing has an inner ring and an outer ring, wherein both ring have raceways for balls being located between the rings.

BACKGROUND OF THE INVENTION

Such a wheel bearing arrangement is usually employed for supporting a wheel shaft or hub of a vehicle wheel. For usual applications in cars existing bearing arrangements are well developed to support the wheel precisely for a sufficient time of operation.

This is not necessarily the case with regard to wheel bearing arrangements which are operated under extreme loads, like e. g. the wheel bearings in a racing car, specifically in a Formula 1 racing car. Also here, a certain time of operation must be guaranteed. Due to the nature of such an application it is an important additional aspect to minimize the friction in the bearing during operation.

It is an object of the invention to propose a wheel bearing arrangement which guarantees a desired life time but reduces the friction in the bearing significantly.

SUMMARY OF THE INVENTION

A solution according to the invention is characterized in that at least one of the rings of the ball bearing is made from a ball bearing steel produced by a powder metallurgical process using a powder metallurgy component including
   0.5 to 2.0 weight-% C (Carbon),
   a maximum of 0.035 weight-% S (Sulfur),
   3.0 to 5.0 weight-% Cr (Chromium),
   1.0 to 4.0 weight-% V (Vanadium),
   1.0 to 12.0 weight-% W (Wolfram) and
   2.0 to 12.0 weight-% Mo (Molybdenum),
wherein at least one raceway has a radius and the balls have a diameter which fulfill the equation:

$$r_{I/O}/D_B > 0.53.$$

Preferably, the powder metallurgy component including
   1.3 to 1.4 weight-% C (Carbon),
   a maximum of 0.035 weight-% S (Sulfur),
   3.50 to 4.25 weight-% Cr (Chromium),
   1.75 to 2.20 weight-% V (Vanadium),
   5.75 to 6.50 weight-% W (Wolfram) and
   10.0 to 11.0 weight-% Mo (Molybdenum).

The powder metallurgy component can also include 5.0 to 12.0 weight-% Co.

The total amount of all parts of the powder metallurgy component, possibly including unavoidable contaminants, is 100.0 weight-%.

The mentioned steel composition according to the second example is known as such as M62 steel. For details reference is made to U.S. Pat. No. 7,018,107 B2.

The above mentioned ratio between the radius of the raceway and the diameter of the ball defines the osculation between the balls and the raceway in which the ball is running.

Preferably, both of the rings of the ball bearing are made from the ball bearing steel produced by a powder metallurgical process.

The surface of the raceways has preferably a hardness between 65 HRC and 70 HRC.

A preferred embodiment of the invention comes up with two ball bearings which are arranged adjacent to another to support a wheel shaft or hub, wherein the two ball bearings are angular contact ball bearings (ACBB).

In this case, a first ball bearing can be arranged at an outboard side (directed to the wheel) and a second ball bearing can be arranged at an inboard side (remote from the wheel) relatively to the wheel to be supported, wherein at least one raceway of the first bearing fulfill the equation:

$$r_{I/O}/D_B > 0.54.$$

and wherein at least one raceway of the second bearing fulfills the equation:

$$r_{I/O}/D_B > 0.53.$$

Also, as an alternative the inboard and outboard bearings can also be changed with respect to the different osculations. In general, it can be said that it is beneficial that the most critical bearing is equipped with the smaller value for the osculation and the other bearing has the bigger value for the osculation.

The contact angles of the two ball bearings of the ACBB can be different.

The two inner rings of the two bearings can be made as a one-piece element, i. e. an inner ring member can have two raceways for a double row arrangement. Alternatively, the two outer rings of the two bearings can be made as a one-piece element.

The balls of the at least one ball bearing can be made of ceramic material.

According to a preferred application, the wheel bearing arrangement is part of a racing car, especially of a Formula 1 racing car.

The proposed invention provides a wheel bearing arrangement which is able to carry high loads and which is designed to operate reliable during a desired lifetime. In spite of this, the friction is significant lower compared with pre-known concepts.

While a PM62 steel of the kind mentioned above offers a long bearing life the present invention does not use this effect to prolong the lifetime of the bearing for the preferred application but uses the possibilities of the mentioned steel to significantly reduce the friction in the bearing.

It was found that the reduction of friction in the preferred application of a racing car gives a power reduction due to lower friction of about 0.5 hp per wheel.

The steel has a high material hardness between 65 and 70 HRC. Also, the material has a good toughness as known from other bearing steels (e. g. grade 3 steel—no. 52100). The steel is more resistant against surface fatigue and can carry maximum contact stresses which are about 20% higher of a given application load cycle than other high performance steels (grade 3 steel or M50 steel). For equal fatigue strength the bearings show a significant lower friction by opening the ball raceway osculation as defined above. Hereby, the friction can be reduced 40% to 60%; a respective friction power reduction is possible which provides more power for the driving of the car.

That is, the gain in allowable contact stress for a given service life is used according to the invention for the friction reduction.

In a racing car as used in accordance with a preferred application of the concept according to the present invention two thin section ACBB with ceramic balls are employed at each of the four corners of the car. All bearing inner and outer rings can be manufactured from the proposed PM62 steel, which are preferably equipped—as said—with a hardness between 65 and 70 HRC.

The opening of the osculation between the raceways and the balls will increase the maximum contact stresses in the bearing. The highest contact stresses are generated on the inner ring. Due to the design according to the invention a sufficient lifetime is maintained in spite of the described effect. That is, the life or operation time of the bearing is not sacrificed for the improved friction performance.

So, the friction of the wheel bearing can be further reduced while maintaining its life and reliability especially for applications with high cornering loads.

Thus, if a vehicle—especially a Formula 1 racing car—is equipped with bearing arrangements according to the invention it will have a lower wheel friction; the vehicle will be more efficient either with respect to consumption of fuel and/or with respect to a higher acceleration and speed.

BRIEF DESCRIPTION OF THE DRAWINGS

The drawings show an embodiment of the bearing arrangement according to the invention.

DETAILED DESCRIPTION OF THE INVENTION

Figure 1:
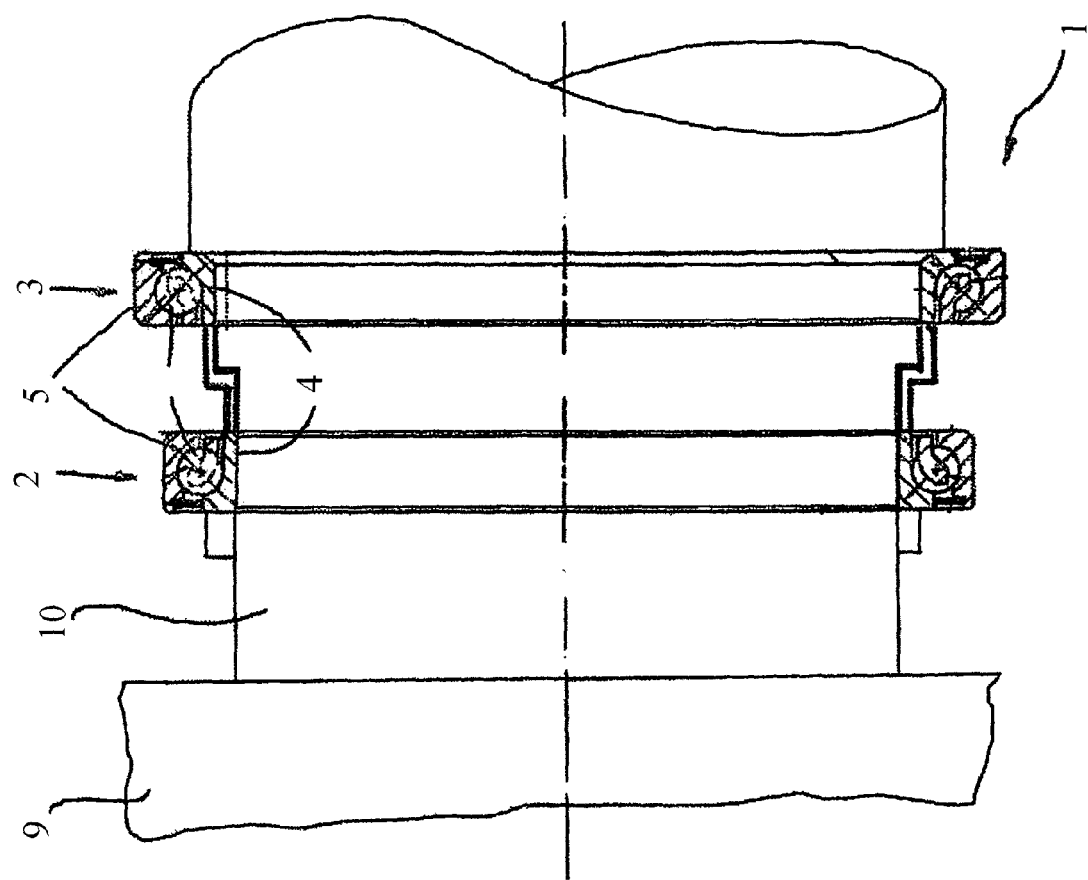
FIG. 1 shows a cross sectional view of a wheel bearing arrangement according to an embodiment of the invention and FIG. 2 shows an enlarged view of a region of a ball bearing which is a part of the wheel bearing arrangement.

In FIG. 1 a wheel bearing arrangement 1 is shown by which a wheel 9 is supported; the wheel 9 has a shaft 10 which is supported in two roller bearings 2 and 3 which are both designed as angular contact ball bearings ACBB. The ball bearing 2 which is arranged adjacent to the wheel 9 is the outboard bearing; the ball bearing 3 which is arranged remote from the wheel 9 is the inboard bearing.

Both ball bearings 2, 3 have respective inner rings 4 and outer rings 5. Between the rings 4, 5 balls 8 made from ceramics are arranged. The inner ring 4 and the outer ring 5 have raceways 6 and 7 respectively for the balls 8 (see FIG. 2).

Figure 2:
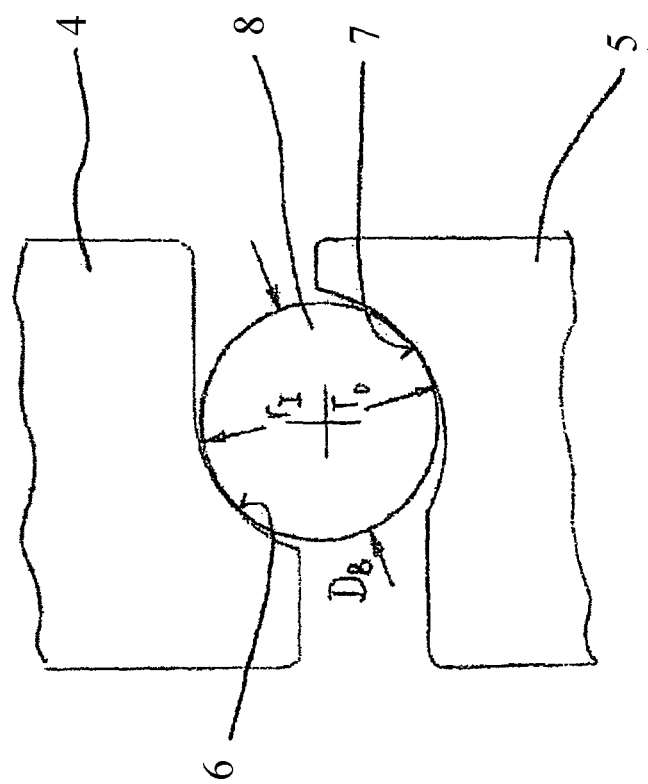

In FIG. 2 the geometrical relations between the raceways of the bearing rings and the balls are depicted. The balls 8 have a diameter DB. The radius of the raceway of the inner ring 4 is denoted with $r_I$. The radius of the raceway of the outer ring 5 is denoted with $r_O$.

The ratio between the radius of the raceway of the inner or outer ring and the diameter of the balls is the osculation between ring and ball and is according to the invention:

$$r_{I/O}/D_B > 0.53.$$

In a specific embodiment of the invention the osculation between the raceway of the inner ring 4 and the balls 8 and the osculation between the raceway of the outer ring 5 and the balls 8 are substantial equal, but there are differences between the two bearings 2 and 3. Therefore, since the diameter of the balls 8 in ball bearing 2 are the same, the radius of the raceway of the inner ring 4 of ball bearing 2 and the radius of the raceway of the outer ring 5 of ball bearing 2 are substantially equal, and, since the diameter of the balls 8 in ball bearing 3 are the same, the radius of the raceway of the inner ring 4 of ball bearing 3 and the radius of the raceway of the outer ring 5 of ball bearing 3 are substantially equal. The outboard bearing 2 has an osculation of $r_{I/O}/D_B > 0.54$, while the inboard bearing 3 has a smaller osculation of $r_{2I/2O}/D_{2B} > 0.53$.

The mentioned ratio of osculation of the outboard bearing 2 is preferably between 0.54 and 0.545; the mentioned ratio of osculation of the inboard bearing 3 is preferably between 0.53 and 0.535.

All mentioned ratios for the osculation remain preferably below 0.55.

The invention claimed is:

1. A wheel bearing arrangement for supporting a wheel of a vehicle, comprising a first roller bearing and a second roller bearing both positioned proximate to the wheel, wherein the first roller bearing comprises a first inner raceway, a first outer raceway, and a first set of balls having a first diameter ($D_B$) therebetween, the second roller bearing comprises a second inner raceway, a second outer raceway, and a second set of balls having a second diameter ($D_{2B}$) therebetween, the first inner and outer raceways are configured to have substantially the same first raceway radius ($r_{I/O}$), the second inner and outer raceways are configured to have substantially the same second raceway radius ($r_{2I/2O}$), wherein at least one of the inner and outer raceways of each of the first and second roller bearings is made from a ball bearing steel produced by a powder metallurgical process using a powder metallurgy component including:

0.5 to 2.0 weight-% C,
a maximum of 0.035 weight-% S,
3.0 to 5.0 weight-% Cr,
1.0 to 4.0 weight-% V,
1.0 to 12.0 weight-% W and
2.0 to 12.0 weight-% Mo, wherein the first raceway radius and the first diameter of the first set of balls fulfil the equation:

$$0.545 \text{ (zero point five four five)} > r_{I/O}/D_B > 0.54 \text{ (zero point five four)}$$

wherein the second raceway radius and the second diameter of the second set of balls fulfil the equation:

$$0.535 \text{ (zero point five three five)} > r_{2I/2O}/D_{2B} > 0.53 \text{ (zero point five three)},$$

and wherein the first roller bearing is arranged closer to the wheel than the second roller bearing.

2. The wheel bearing arrangement according to claim 1, wherein the powder metallurgy component includes:

1.3 to 1.4 weight-% C,
a maximum of 0.035 weight-% S,
3.50 to 4.25 weight-% Cr,
1.75 to 2.20 weight-% V,
5.75 to 6.50 weight-% W and
10.0 to 11.0 weight-% Mo.

3. The wheel bearing arrangement according to claim 1, wherein the powder metallurgy component further comprises 5.0 to 12.0 weight-% Co.

4. The wheel bearing arrangement according to claim 1, wherein both of the inner and outer raceways of the first and second roller bearings are made from the ball bearing steel produced by the powder metallurgical process.

5. The wheel bearing arrangement according to claim 1, wherein a surface of the raceways has a hardness between 65 HRC and 70 HRC.

6. The wheel bearing arrangement according to claim 1, wherein the first and second roller bearings are arranged adjacent to another to support one of a wheel shaft or a hub, wherein the first and second roller bearings are angular contact ball bearings (ACBB).

7. The wheel bearing arrangement according to claim 6, wherein the contact angles of the first and second roller bearings are different.

8. The wheel bearing arrangement according to claim 6, wherein the first roller bearing comprises a first inner ring and the second roller bearing comprises a second inner ring, the first and second inner rings of the first and second roller bearings are made as a one-piece element.

9. The wheel bearing arrangement according claim 6, wherein the first roller bearing comprises a first outer ring and the second roller bearing comprises a second outer ring, the first and second outer rings of the first and second roller bearings are made as a one-piece element.

10. The wheel bearing arrangement according to claim 1, wherein the first and second set of balls of the first and second roller bearings are made of ceramic material.

11. The wheel bearing arrangement according to claim 1, wherein the wheel bearing arrangement is a component within a Formula 1 racing car.

\* \* \* \* \*